US007932214B2

(12) United States Patent
Zamora et al.

(10) Patent No.: US 7,932,214 B2
(45) Date of Patent: Apr. 26, 2011

(54) FOAMED GEL SYSTEMS FOR FRACTURING SUBTERRANEAN FORMATIONS, AND METHODS FOR MAKING AND USING SAME

(75) Inventors: Frank Zamora, San Antonio, TX (US); Sarkis R. Kakadjian, San Antonio, TX (US); Thomas P Wilson, Jr., Floresville, TX (US)

(73) Assignee: Clearwater International, LLC DE (US)

( * ) Notice: Subject to any disclaimer, the term of this patent is extended or adjusted under 35 U.S.C. 154(b) by 95 days.

(21) Appl. No.: 12/271,580

(22) Filed: Nov. 14, 2008

(65) Prior Publication Data
US 2010/0122815 A1 May 20, 2010

(51) Int. Cl.
*C09K 8/60* (2006.01)
*C09K 8/588* (2006.01)
*E21B 43/26* (2006.01)
*B01F 3/04* (2006.01)

(52) U.S. Cl. ............ 507/202; 166/308.6; 507/240; 507/252; 507/266; 507/904; 507/922; 516/10; 516/14

(58) Field of Classification Search ............ 507/202, 507/240, 252, 266, 904, 922; 516/10, 14; 166/308.6
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinck et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |

(Continued)

OTHER PUBLICATIONS

U.S. Appl. No. 12/075,461, filed Mar. 2008, Gatlin et al.

(Continued)

*Primary Examiner* — Timothy J. Kugel
(74) *Attorney, Agent, or Firm* — Robert W. Strozier

(57) ABSTRACT

An aqueous, foamable composition useful for formation fracturing is disclosed, which includes an ionically coupled gel system. These compositions are well suited in fracturing formation where there are insufficient or non-existent hydration units. Methods for making the compositions and methods using the foamable compositions to fracture formation with insufficient hydration units.

31 Claims, No Drawings

U.S. PATENT DOCUMENTS

| | | | |
|---|---|---|---|
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |
| 2008/0251252 A1* | 10/2008 | Schwartz | 166/280.2 |
| 2010/0077938 A1* | 4/2010 | Zamora et al. | 106/677 |

OTHER PUBLICATIONS

U.S. Appl. No. 11/554,834, filed Oct. 2006, Venditto et al.
U.S. Appl. No. 11/765,306, filed Jun. 2007, Kakadjian et al.
U.S. Appl. No. 11/748,248, filed May 2007, Thompson et al.
U.S. Appl. No. 11/736,971, filed Apr. 2007, Kippie et al.
U.S. Appl. No. 11/767,384, filed Jun. 2007, Sweeney et al.
U.S. Appl. No. 11/741,110, filed Apr. 2007, Wilson, Jr. et al.
U.S. Appl. No. 11/677,434, filed Feb. 2007, Wanner et al.
U.S. Appl. No. 11/736,992, filed Apr. 2007, Zamora et al.
U.S. Appl. No. 11/760,581, filed Jun. 2007, Schwartz.
U.S. Appl. No. 12/029,335, filed Feb. 2008, Kakadjian et al.

* cited by examiner

FOAMED GEL SYSTEMS FOR FRACTURING SUBTERRANEAN FORMATIONS, AND METHODS FOR MAKING AND USING SAME

BACKGROUND OF THE INVENTION

1. Field of the Invention

The present invention relates to an aqueous, foamable composition useful for formation fracturing including an ionically coupled gel system, where the compositions are well suited in fracturing formation where there are insufficient or non-existent hydration units. The present invention also includes methods for making and using the compositions to fracture formation with insufficient hydration units.

More particularly, the present invention relates to an aqueous, foamable composition useful for formation fracturing including: water, an ionically coupled gel system including an anionic or cationic polymer and an oppositely charged foaming agent and a gas, where the gel system and the gas are present in amount sufficient to form an ionically coupled, foamed fracturing composition. The compositions are well suited in fracturing formation where there are insufficient or non-existent hydration units. The present invention also includes methods for making and using the compositions to fracture formation with insufficient hydration units.

2. Description of the Related Art

Historically the use of gelled fracturing fluids in locations where there is no existence of hydration units has been solved by hydrating a lineal gel at different locations. After hydrating the linear gel, transporting the hydrated linear gel to the fracturing location. A more recent approach has been addressed by using a viscoelastic system (VES), where the gel systems are generated from worm-like micellar structures made from a surfactant system such as cetyl t-butyl ammonium chloride, which builds up viscosity immediately when it gets in contact with a brine system.

In the past, it combination of either anionic surfactants, cationic surfactants, no-ionic surfactants and amphoteric surfactants have been used to create a gel system for fracturing applications. Only in U.S. Pat. No. 7,205,262 is there even a mention of using gels including oppositely charged components for fracturing applications, but the patent did not mention using such systems in foamed fracturing applications.

In U.S. Pat. No. 5,169,441 suggested the use of Zeta Potential for characterizing particulates such as pigments treated with cationic polymers. U.S. Pat. No. 5,846,308 disclosed the stabilization of a rosin dispersion for use as a sizing composition by treating it with a "cationic colloidal coacervate" which may include both a cationic polymer and an anionic surfactant; the finished sizing composition is to have a Zeta Potential of at least 20 millivolts. Poly(diallyldimethyl ammonium chloride), sometimes known as polyDADMAC, is the preferred cationic polymer. Also, U.S. Pat. No. 6,315,824 describes a similar coacervate stabilizing system used for hydrophobic non-rosin sizing agents, which may be liquid as well as solid. See also U.S. Pat. No. 4,507,210, which suggests a correlation of Zeta Potential to certain filtration properties in the treatment of shale and clay in hydrocarbon recovery; see also U.S. Pat. No. 5,196,401.

Other compositions comprising a cationic polymer and an anionic surfactant, often in high ratios of anionic surfactant to cationic polymer, may be found in U.S. Pat. No. 6,110,451, U.S. Pat. No. 4,948,576, and the shampoo and other personal care products described by U.S. Pat. Nos. 6,297,203, 6,221,817, U.S. Pat. No. 6,284,230, (which also describes betaines) U.S. Pat. No. 5,137,715, and U.S. Pat. No. 6,248,317.

In the field of hydrocarbon recovery from the earth, formation fracturing fluids proposed in CA2,257,699 combine anionic surfactants such as sodium xylene sulfonate and cationic surfactants such as N,N,N, trimethyl-1-octadecammonium chloride to make a gel said to be viscoelastic. Carbon dioxide is added to similar combinations in CA2,257,697 to generate a foam. U.S. Pat. No. 4,409,110, describe formation flooding compositions which may comprise cationic polymers and anionic surfactants. Numerous combinations of surfactants and other compounds are proposed in U.S. Pat. No. 6,258,859 (WO 98/56497; PCT/US/12067). See also the compositions said to be viscoelastic and proposed for well treatment in U.S. Pat. No. 6,232,274 and U.S. Pat. No. 6,194,356.

Combinations of cationic polymers, betaines, and anionic surfactants may be inferred from the numerous combinations of materials that are possibly viscoelastic within the disclosure in U.S. Pat. No. 5,956,502, dealing with compositions for use on the hair and skin. See also the combination of cationic polymer with anionic surfactants for use as an automatic dishwashing detergent, in U.S. Pat. No. 6,281,180.

In U.S. Pat. Nos. 7,182,239 and 7,205,262, disclosed a micellar combinations of cationic or anionic polymers and oppositely charged surfactants are made preferably with $C_6$ to $C_{23}$ alcohols in proportions coordinated in aqueous media with the aid of Zeta Potential measurements. The resulting gels are useful in drilling and formation fracturing in hydrocarbon recovery, manifesting excellent proppant suspending properties in low concentrations of polymer and surfactant as compared to the prior art.

Although there are foaming systems of use in fracturing formations that do not have adequate hydration units, there is still a need in the art for other fracturing compositions that can be used to fracture formation including formation having inadequate or no hydration units.

DEFINITIONS USED IN THE INVENTION

The term "oppositely charged surfactant" means that the surfactant has a charge opposite the polymer is sometimes called herein the "counterionic surfactant." By this we mean a surfactant having a charge opposite that of the polymer.

The term "foamable" means a composition that when mixed with a gas forms a stable foam.

The term "ionically coupled gel" means a gel formed from the interaction between a charged polymers and oppositely charged surfactants.

The term "gpt" means gallons per thousand gallons.

The term "ppt" means pounds per thousand gallons.

SUMMARY OF THE INVENTION

Certain embodiments of the present invention provide an aqueous composition useful for formation fracturing including: water, an ionically coupled gel system including an anionic or cationic polymer and an oppositely charged foaming agent and a gas, where the gel system and the gas are present in amount sufficient to form an ionically coupled, foamed fracturing composition.

Certain embodiments of the present invention provide a method for making a foamable fracturing composition of this invention including the step of dissolving an anionic or cationic polymer in water and then adding an oppositely charged foaming agent, where the two components are present in an amount sufficient to form an ionically coupled gel system.

The ionically coupled or ionically associated gel system comprises an ionically associated charged polymer and an oppositely charged foaming agent.

Certain embodiments of the present invention provide a method for making a foamed fracturing composition of this invention including the step of dissolving an anionic or cationic polymer in water and then adding an oppositely charged foaming agent, where the two components are present in an amount sufficient to form a foamable, ionically coupled gel fracturing composition. The gel comprises an ionically associated charged polymer and an oppositely charged foaming agent. The method also includes the step of adding a gas to a sufficient amount of the foamable, ionically coupled gel fracturing composition to form a foamed, ionically coupled gel fracturing composition.

Certain embodiments of the present invention provide a method for fracturing a formation including the step of pumping a fracturing fluid including a proppant and a gas into a producing formation at a pressure sufficient to fracture the formation and to enhance productivity, where the fracturing fluid includes water, a foamable, ionically coupled gel fracturing composition including an anionic or cationic polymer and an oppositely charged foaming agent, where the gel and the gas are present in amounts sufficient to form a foamed, ionically coupled gel fracturing composition and where the proppant props open the formation after fracturing.

Certain embodiments of the present invention provide a method for fracturing a formation including the step of pumping a fracturing fluid and a gas into a producing formation at a pressure sufficient to fracture the formation and to enhance productivity, where the fracturing fluid includes water, a foamable, ionically coupled gel fracturing composition including an anionic or cationic polymer and an oppositely charged foaming agent, where the gel and the gas are present in amounts sufficient to form a foamed fracturing, ionically coupled gel composition and where the proppant props open the formation after fracturing. The method can also include the step of pumping a proppant after fracturing to prop open the fractured formation.

DETAILED DESCRIPTION OF THE INVENTION

The inventors have found that a foamed fluid composition can be prepared for fracturing formations, which is based on gels formed due to an interaction between cationic polymers (typically used as clay stabilizers to decrease clay swelling/fine migration) and anionic surfactant (typically used as foamers). The interaction is due to ionic bonding (or electrostatic or electrovalently bonding) between the cationic polymers and the anionic foaming agents. Cationic polymers like poly diallyl dimethyl ammonium chloride dissolve and hydrate in water immediately. Once in solution, the polymers are allowed to interact with an anionic surfactant such as sodium lauryl sulfate to generate an in situ gel, which can be foamed with either nitrogen or carbon dioxide without the use of any additional foaming agent. The inventors have found that one embodiment of the present composition, a new fracturing composition, differentiated from existing composition, can be constructed from a cationic polymeric clay stabilizer and an anionic surfactant or foaming agent, which interact to form a gel product comprising an electrostatically bonded gel system and generating a high viscosity gel, which can be used in nitrogen and $CO_2$ foam fracturing applications.

In certain embodiments, we use polymers of diallyl dimethyl ammonium chloride. In other embodiments, we use homopolymers of diallyl dimethyl ammonium chloride. However, where cationic polymers are used in our invention, we may use any water soluble cationic polymer effective to viscosity water. In certain embodiments, the polymers have a molecular weight of at least 7,000 g/mole. Such polymers include homopolymers and copolymers made with cationic monomers (that is, at least 20% of the monomer units contain cationic functional groups, while the balance may be non-functional or nonionic) such as diallyl dimethyl ammonium chloride, methacrylamidopropyl trimethyl ammonium chloride, acryloxyethyl trimethyl ammonium chloride, diallyl diethyl ammonium chloride, methacryloxyethyl trimethyl ammonium chloride, vinyl pyridine, vinyl benzyl trimethyl ammonium chloride, other similar cationic polymers or mixtures or combinations thereof.

In certain embodiments, the anionic surfactant to be used with the cationic polymer is ammonium lauryl sulfate, but any alkali metal alkyl sulfate or sulfonate having 8 to 22 carbon atoms may be used, and alkyl ether sulfates and sulfonates having 8 to 22 carbon atoms are included within our term "counterionic surfactant" and mixtures or combinations thereof. Commercial forms of ammonium lauryl sulfate including minor or even significant amounts of other similar surfactants may be used. Other common anionic surfactants may also be useful.

When used, the amine oxide promoter is in certain embodiments lauryl amine oxide, but we may use any amine oxide of the formula $R^1R^2R^3N\rightarrow O$, in other embodiments $R^1N(CH_3)_2\rightarrow O$, where $R^1$ is an alkyl group of 8 to 22 carbon atoms, and $R^1$ and $R^2$ are independently alkyl groups having from 1 to 4 carbon atoms and mixtures or combinations thereof. We may use any amine oxide of the formula $R^1R^2R^3N\rightarrow O$ as defined in U.S. Pat. No. 6,258,859, which is hereby incorporated by reference in its entirety. See also U.S. Pat. No. 3,303,896 and U.S. Pat. No. 4,108,782, which are also incorporated by reference in their entirety for their descriptions of amine oxides.

When used, the amphoteric surfactant is in certain embodiments a betaine such as cocamidopropyl betaine, but we may use other types of amphoteric surfactants, including aminopropionate and sultaines. We may use any of the surfactant betaines listed or described in U.S. Pat. No. 6,284,230, which is hereby incorporated by reference in its entirety.

Where an anionic polymer is used, in certain embodiments we use copolymers of acrylamide and acrylic acid, terpolymers of acrylamide-acrylic acid-AMPS, poly-l-glutamates, sodium polystyrene-sulfonates, potassium polystyrene-sulfonates, copolymers of methacrylamide and acrylic acid, copolymers of acrylamide and methacrylic acid, copolymers of methacrylamide and methacrylic acid, polymers including acrylamide, acrylic acid, methacrylamide and methacrylic acid, and mixture or combinations thereof. This may be done with or without gel promoters, but where there are no gel promoters, the concentration of anionic polymer will be significantly higher than where a gel promoter is used.

Suitable Reagents

Suitable cationic polymers include polyamines, quaternary derivatives of cellulose ethers, quaternary derivatives of guar, homopolymers and copolymers of at least 20 mole percent dimethyl diallyl ammonium chloride (DMDAAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), and quaternary derivatives of starch and mixtures or combinations thereof.

Suitable anionic polymers include homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid and mixtures or combinations thereof.

Anionic surfactants suitable for use with the cationic polymers include alkyl, aryl or alkyl aryl sulfates, alkyl, aryl or alkyl aryl carboxylates or alkyl, aryl or alkyl aryl sulfonates. In certain embodiments, the alkyl moieties have about 1 to about 18 carbons, the aryl moieties have about 6 to about 12 carbons, and the alkyl aryl moieties have about 7 to about 30 carbons. Exemplary groups are propyl, butyl, hexyl, decyl, dodecyl, phenyl, benzyl and linear or branched alkyl benzene derivatives of the carboxylates, sulfates and sulfonates. Included are alkyl ether sulphates, alkaryl sulphonates, alkyl succinates, alkyl sulphosuccinates, N-alkoyl sarcinates, alkyl phosphates, alkyl ether phosphates, alkyl ether carboxylates, alpha-olefin sulphonates and acyl methyl taurates, especially their sodium, magnesium ammonium and mono-, di- and triethanolamine salts or mixtures or combinations thereof. The alkyl and acyl groups generally contain from 8 to 18 carbon atoms and may be unsaturated. The alkyl ether sulphates, alkyl ether phosphates and alkyl ether carboxylates may contain from one to 10 ethylene oxide or propylene oxide units per molecule. In certain embodiments, the alkyl ether sulphates, alkyl ether phosphates and alkyl ether carboxylates contain 2 to 3 ethylene oxide units per molecule. Examples of suitable anionic surfactants include ammonium lauryl sulphate, ammonium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, triethanolamine dodecyl sulfate, ammonium cocoyl isethionate, ammonium lauroyl isethionate, and ammonium N-lauryl sarcosinate and mixtures or combinations thereof. In other embodiments, some of the anionic surfactants can be sodium, potassium, cesium or other similar anionic surfactants or mixtures of these alkali metal surfactants with ammonium surfactants.

Cationic surfactants suitable for use with the anionic polymers include quaternary ammonium surfactants of the formula $X^-N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl group having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate and mixtures or combinations thereof. The aliphatic groups may contain hydroxy groups, in addition to carbon and hydrogen atoms, ether linkages, and other groups such hydroxyl or amino group substituents (e.g., the alkyl groups can contain polyethylene glycol and polypropylene glycol moieties). The longer chain aliphatic groups, e.g., those of about 12 carbons, or higher, can be saturated or unsaturated. In other embodiments, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Suitable lower alcohols for use in the present invention include, without limitation, alcohols of the general formula ROH, where R is a linear or branched carbyl group having between 1 and 5 carbon atoms, where one or more carbons atoms can be replaced with an oxygen, nitrogen, or sulfur atom, and one or more of the hydrogen atoms can be replaced with a halogen atom, an alkoxy group, a amide group or any other group that can replace a hydrogen atom and does not adversely affect the properties of the alcohol. In certain embodiment, the of the general formula $C_nH_{2n+2}OH$, where m is an integer having a value between about 1 and about 5. In certain embodiment, n is an integer having a value between 2 and 4. In other embodiment, n is an integer having a value between 3 and 4. In other embodiment, n is an integer having a value of 3.

By a gel promoter we mean a betaine, a sultaine or hydroxysultaine, or an amine oxide.

Examples of betaines include the higher alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl)carboxymethyl betaine, oleyl dimethyl gamma-carboxypropyl betaine, lauryl bis-(2-hydroxypropyl)alpha-carboxyethyl betaine, coco dimethyl sulfopropyl betaine, lauryl dimethyl sulfoethyl betaine, lauryl bis-(2-hydroxyethyl)sulfopropyl betaine, amidobetaines and amidosulfobetaines (wherein the RCONH $(CH_2)_3$ radical is attached to the nitrogen atom of the betaine, oleyl betaine, and cocamidopropyl betaine and mixtures or combinations thereof. Examples of sultaines and hydroxysultaines include materials such as cocamidopropyl hydroxysultaine.

Amphoteric surfactants suitable for use with either cationic polymers or anionic polymers include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate and mixtures or combinations thereof. Suitable amphoteric surfactants include derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfonate, sulfate, phosphate, or phosphonate and mixtures or combinations thereof. Examples of compounds falling within this definition are sodium 3-dodecylaminopropionate, and sodium 3-dodecylaminopropane sulfonate and mixtures or combinations thereof.

Suitable amine oxides include, without limitation, cocoamidopropyl dimethyl amine oxide and other compounds of the formula $R^1R^2R^3N\rightarrow O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms and mixtures or combinations thereof. In other embodiments, $R^3$ is an aliphatic or substituted aliphatic hydrocarbyl having at least about 12 and up to about 24 carbon atoms and mixtures or combinations thereof. In other embodiments, $R^3$ is an aliphatic group having at least about 12 carbon atoms and having up to about 22 and mixtures or combinations thereof. In other embodiments, an aliphatic group having at least about 18 and no more than about 22 carbon atoms and mixtures or combinations thereof.

Suitable gases for foaming the foamable, ionically coupled gel composition include, without limitation, nitrogen, carbon dioxide, or any other gas suitable for use in formation fracturing, or mixtures or combinations thereof.

Compositional Ranges

In certain embodiments, the compositions of this invention include aqueous ionically coupled gels. The gels include water and (a) between about 0.5 wt. % and about 20 wt. % of a charged polymer and (b) between about 0.1 wt. % and about 50 wt. % of an oppositely charged surfactant or foaming agent. The gels can also include (c) between about 0.01 wt. % and about 20 wt. % of a betaine. The gels can also include (d) between about 1 wt. % and about 35 wt. % of an amine oxide. The gels can also include (e) between about 0.1 wt. % and about 20 wt. % of a lower alcohol.

Where an anionic polymer is used, our compositions include aqueous gels comprising water and, by weight based on the water, (a) between about 1 wt. % and about 20 wt. % of an anionic polymer and (b) between about 0.5 wt. % and about 50 wt. % of a cationic surfactant or foaming agent. The gels can also include (c) between about 0.1 wt. % to 20 wt. % of a betaine. The gels can also include (d) 2 wt. % and about 35 wt. % of an amine oxide. The gels can also include (e) between about 1 wt. % and about 20 wt. % of a lower alcohol.

Where a cationic polymer is used, our compositions include aqueous gels comprising water and, by weight based on the water, (a) between about 2.5 wt. % and about 20 wt. % of a cationic polymer and (b) between about 1 wt. % and about 50 wt. % of an anionic surfactant or foaming agent. The gels can also include (c) 1 wt. % and about 20 wt. % of a betaine. The gels can also include (d) between about 5 wt. % and about 35 wt. % of an amine oxide. The gels can also include (e) between about 2 wt. % and about 20 wt. % of a lower alcohol.

Our invention also includes a method of making an aqueous gel comprising adding to water (a) between about 0.5 wt. % and about 20 wt. % of a charged polymer with mixing. After mixing in the charged polymer solution, (b) between about 0.1 wt. % and about 50 wt. % of an oppositely charged surfactant is added with stirring to form a foamable, ionically coupled gel. The foamable, ionically coupled gels can then be foamed using a gas to form the foamed, ionically coupled gel fracturing composition, which can then be forced into a formation to fracture the formation.

In addition, our invention includes a method of fracturing a subterranean formation comprising forming a gel or a coacervate as described herein and pumping the gel or coacervate down a wellbore, together with a proppant and under pressure sufficient to fracture the formation. Proppants suitable for our invention include all the generally used or generally accepted proppant materials such as sand, shells, and other hard particulates. The gel may be used in the absence of conventional brine-forming salts. Aqueous based gels used for formation fracturing and other well treatment usually employ guar, cellulose, or gums that depend on chemical bonding and are shear-sensitive. The compositions of our invention can be easily pumped, yet will form strong gels when in use. While our compositions are directly to fracturing, they can also be used in well drilling, where the gel systems are used in a concentration range between about 0.25% and about 1% or more by weight whether or not foam is deliberately generated. In subterranean formation fracturing, the gel system of this invention are generally used at concentration ranges between about 0.75% and about 1.5% gel or more by weight in the fracturing fluid (which will normally include a proppant) are useful. Our gel compositions are compatible with conventional drilling fluid and fracturing fluid compositions. Gel breakers may be employed with them, where the breakers interfere with the ionic coupling of the charged polymer and oppositely charged foaming agent.

EXPERIMENTS OF THIS INVENTION

General Method for Preparation of Compositions

Preparation of Additive A

Additive A was prepared by adding 16.5 wt. % of a 16.25 wt. % poly dially dimethyl ammonium chloride (pDADMAC) solution, 2.63 wt. % cocoamidopropyl betaine, and 3.46 wt. % coco amine oxide to 77.66 wt. % deionized water with mixing.

Preparation of Additive A

Additive B was prepared by adding 25.0 wt. % ammonium lauryl sulfate and 10 wt. % isopropyl alcohol (IPA) to 65 wt. % dionized water with mixing.

Preparation of Foamable Ionically Coupled Gel Fracturing Compositions

Added an amount of Additive A to water to prepare a desired concentration of Additive A. To this solution add an amount of Additive B to the Additive A solution to form a foamable ionically coupled gel fracturing compositions. The amount of Additive A generally ranges from about 5 gpt to about 50 gpt and the amount of Additive B generally ranges from about 0.5 gpt to about 20 gpt. In certain embodiments, the amount of Additive A ranges from about 7.5 gpt to about 45 gpt and the amount of Additive B generally ranges from about 1 gpt to about 15 gpt. In other embodiments, the amount of Additive A ranges from about 10 gpt to about 40 gpt and the amount of Additive B generally ranges from about 1 gpt to about 12.5 gpt. In other embodiments, the amount of Additive A ranges from about 10 gpt to about 40 gpt and the amount of Additive B generally ranges from about 2.5 gpt to about 10 gpt. In certain embodiments, a ratio of Additive A to Additive B is between about 2:1 and about 6:1. In other embodiments, the ratio of Additive A to Additive B is between about 3:1 and about 5:1. In other embodiments, the ratio of Additive A to Additive B is about 4:1. In other embodiments, the gel system is present in the fracturing fluid in a range between about 5.5 gpt and about 70 gpt with the indicated ratio of Additive A to Additive B. In other embodiments, the gel system is present in the fracturing fluid in a range between about 7.5 gpt and about 60 gpt with the indicated ratio of Additive A to Additive B. In other embodiments, the gel system is present in the fracturing fluid in a range between about 11 gpt and about 52.5 gpt with the indicated ratio of Additive A to Additive B. In other embodiments, the gel system is present in the fracturing fluid in a range between about 12.5 gpt and about 50 gpt with the indicated ratio of Additive A to Additive B.

General Method for Foam Testing

A desired amount of Additive A was added to 100 mL of tap water and mixed for 10 second in a Hamilton Beach mixer @ 7000 RPM. A desired amount of Additive B was then added to the previous solution and mix for one minute in the Hamilton Beach mixer @ 7000 RPM. The foam generated was poured into the graduated cylinder, and the foam high was measured. The half life time was measured as the time it took for the foam to reduce in volume to 50% of its original foam height.

TABLE 1

Foaming Tests in Salt Water

| Additive A (gpt) | Additive B (gpt) | Half Life (min:sec) | Foam Height (mL) | Viscosity r1:B1 @ 511 $s^{-1}$ (cP) |
|---|---|---|---|---|
| 40 | 10 | >4 hours | 300 | 73.0 |
| 25 | 6.2 | >4 hours | 400 | 29.3 |
| 20 | 5.0 | >4 hours | 400 | 21.9 |
| 17.5 | 4.4 | >4 hours | 320 | 16.2 |

TABLE 1-continued

Foaming Tests in Salt Water

| Additive A (gpt) | Additive B (gpt) | Half Life (min:sec) | Foam Height (mL) | Viscosity r1:B1 @ 511 s$^{-1}$ (cP) |
|---|---|---|---|---|
| 15 | 3.8 | 8:13 | 300 | 10.5 |
| 10 | 2.5 | 6:01 | 280 | 5.0 |

All references cited herein are incorporated by reference. Although the invention has been disclosed with reference to its disclosed embodiments, from reading this description those of skill in the art may appreciate changes and modification that may be made which do not depart from the scope and spirit of the invention as described above and claimed hereafter.

We claim:

1. An aqueous composition useful for formation fracturing comprising:
    water,
    an ionically coupled gel system including:
        between about 0.5 wt. % and about 20 wt. % of a charged polymer,
        between about 0.1 wt. % and about 50 wt. % of an oppositely charged foaming agent,
        between about 0.01 wt. % and about 20 wt. % of a betaine:
        between about 1 wt. % and about 35 wt. % of an amine oxide, and
        between about 0.11 wt. % and about 20 wt. % of a lower alcohol having between 1 and 5 carbon atoms, where one or more carbons atoms can be replaced with an oxygen, nitrogen, or sulfur atom, and
    a gas,
    where the gel system and the gas are present in amount sufficient to form an ionically coupled, foamed fracturing composition.

2. The composition of claim 1, wherein the gel system includes:
    between about 1 wt. % and about 20 wt. % of an anionic polymer,
    between about 0.5 wt. % and about 50 wt. % of a cationic foaming agent,
    between about 0.1 wt. % and about 20 wt. % of a betaine,
    between about 2 wt. % and about 35 wt. % of an amine oxide, and
    between about 1 wt. % and about 20 wt. % of a lower alcohol.

3. The composition of claim 2, wherein the cationic foaming agents comprise quaternary ammonium surfactants of the formula $X^-N^+R^1R^2R^3$ where $R^1$, $R^2$, and $R^3$ are independently selected from the group consisting of hydrogen, an aliphatic group, an aromatic group, an aryl group, an alkoxy group, a polyoxyalkylene group, an alkylamido group, an hydroxyalkyl group, and an alkylaryl group, where the groups have from about 1 to about 22 carbon atoms; and X is an anion selected from the group consisting of halogen, acetate, phosphate, nitrate, sulfate, alkylsulfate radicals, tosylate, lactate, citrate, and glycolate and mixtures or combinations thereof.

4. The composition of claim 3, wherein the $R^1$ is an alkyl group having from about 12 to about 18 carbon atoms; $R^2$ is selected from H or an alkyl group having from about 1 to about 18 carbon atoms; and $R^3$ and $R^4$ are independently selected from H or an alkyl group having from about 1 to about 3 carbon atoms.

5. The composition of claim 2, wherein the anionic polymers comprise homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid or mixtures and combinations thereof.

6. The composition of claim 1, wherein the gel system includes:
    between about 2.5 wt. % and about 20 wt. % of a cationic polymer,
    between about 1 wt. % and about 50 wt. % of an anionic foaming agent,
    between about 1 wt. % and about 20 wt. % of a betaine,
    between about 5 wt. % and about 35 wt. % of an amine oxide, and
    between about 2 wt. % and about 20 wt. % of a lower alcohol having between 1 and 5 carbon atoms, where one or more carbons atoms can be replaced with an oxygen, nitrogen, or sulfur atom.

7. The composition of claim 6, wherein the cationic polymers comprise polyamines, quaternary derivatives of cellulose ethers, quaternary derivatives of guar, homopolymers and copolymers of at least 20 mole percent dimethyl diallyl ammonium chloride (DMDAAC) or diallyl dimethyl ammonium chloride (DADMAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), quaternary derivatives of starch or mixtures and combinations thereof.

8. The composition of claim 6, wherein the anionic foaming agents comprise alkyl sulfates, aryl sulfates, alkyl aryl sulfates, alkyl carboxylates, aryl carboxylates, alkyl aryl carboxylates, or alkyl sulfonates, aryl sulfonates or alkyl aryl sulfonates.

9. The composition of claim 6, wherein the anionic foaming agents comprise alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates, acyl methyl taurates, sodium, magnesium ammonium and mono-, di- and triethanolamine salts or mixtures and combinations thereof, where the alkyl and acyl groups are saturated or unsaturated including from 8 to 18 carbon atoms, where the alkyl ether sulphates, alkyl ether phosphates and alkyl ether carboxylates include from one to 10 ethylene oxide or propylene oxide units per molecule.

10. The composition of claim 1, wherein the gel system further includes:
    a lower alcohol of the general formula $C_nH_{2n+2}OH$, where n is an integer having a value between about 1 and about 5.

11. The composition of claim 10, wherein the n is an integer having a value between 2 and 4.

12. The composition of claim 10, wherein the n is an integer having a value between 3 and 4.

13. The composition of claim 10, wherein the n is an integer having a value of 3.

14. The composition of claim 1, wherein the lower alcohols comprise alcohols of the general formula ROH, where R is a linear or branched carbyl group having between 1 and 5 carbon atoms, where one or more carbons atoms can be replaced with an oxygen, nitrogen, or sulfur atom, and one or more of the hydrogen atoms can be replaced with a halogen atom, an alkoxy group, a amide group or any other group that can replace a hydrogen atom and does not adversely affect the properties of the alcohol.

15. The composition of claim 1, wherein the betaines include coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl)carboxymethyl betaine, oleyl dimethyl gamma-carboxypropyl betaine, lauryl bis-(2-hydroxypropyl)alpha-carboxyethyl betaine, coco dimethyl sulfopropyl betaine, lauryl dimethyl sulfoethyl betaine, lauryl bis-(2-hydroxyethyl)sulfopropyl betaine, amidobetaines and amidosulfobetaines, where the RCONH $(CH_2)_3$ radical is attached to the nitrogen atom of the betaine, oleyl betaine, and cocamidopropyl betaine or mixtures and combinations thereof.

16. The composition of claim 1, wherein the amine oxides include cocoamidopropyl dimethyl amine oxide and other compounds of the formula $R^1R^2R^3N \rightarrow O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms and mixtures or combinations thereof.

17. The composition of claim 1, wherein the gases include nitrogen, carbon dioxide, or any other gas suitable for use in formation fracturing, or mixtures or combinations thereof.

18. A composition comprising:
a fracturing fluid including between about 5.5 gpt and about 70 gpt of a gel system, where the gel system comprises:
  a first amount of a first additive composition including:
    about 16.5 wt. % of a 16.25 wt. % poly diallyl dimethyl ammonium chloride (pDADMAC) solution,
    about 2.63 wt. % cocoamidopropyl betaine,
    about 3.46 wt. % coco amine oxide, and
    about 77.66 wt. % deionized water; and
  a second amount of a second additive composition including:
    about 25.0 wt. % ammonium lauryl sulfate,
    about 10 wt. % isopropyl alcohol (IPA), and
    about 65 wt. % dionized water,
  present in a ratio of the first additive to the second additive between about 2:1 and about 6:1.

19. The composition of claim 18, wherein the first amount ranges from about 5 gpt to about 50 gpt and the second amount ranges from about 0.5 gpt to about 20 gpt.

20. The composition of claim 18, wherein the first amount ranges from about 7.5 gpt to about 45 gpt and the second amount ranges from about 1 gpt to about 15 gpt.

21. The composition of claim 18, wherein the first amount ranges from about 10 gpt to about 40 gpt and the second amount ranges from about 1 gpt to about 12.5 gpt.

22. The composition of claim 18, wherein the first amount ranges from about 10 gpt to about 40 gpt and the second amount ranges from about 2.5 gpt to about 10 gpt.

23. The composition of claim 18, wherein the ratio is between about 3:1 and about 5:1.

24. The composition of claim 18, wherein the ratio of is about 4:1.

25. The composition of claim 18, wherein the gel system is present in a range between about 12.5 gpt and about 50 gpt.

26. A method for fracturing a formation comprising the step of:

forming a fracturing fluid including between about 5.5 gpt and about 70 gpt of an ionically coupled gel system and a sufficient amount of a proppant to prop open fractures produced in the formation during fracturing, where the ionically coupled gel system comprises between about 0.5 wt. % and about 20 wt. % of a charged polymer, between about 0.1 wt. % and about 50 wt. % of an oppositely charged foaming agent, between about 0.01 wt. % and about 20 wt. % of a betaine, between about 1 wt. % and about 35 wt. % of an amine oxide, and between about 0.1 wt. % and about 20 wt. % of a lower alcohol having between 1 and 5 carbon atoms, where one or more carbons atoms can be replaced with an oxygen, nitrogen, or sulfur atom, pumping the fracturing fluid and a gas into a formation at a pressure sufficient to fracture the formation and to enhance productivity, where the gel and the gas are present in amounts sufficient to form a foamed, ionically coupled gel fracturing fluid and where the proppant props open the formation after and/or during fracturing.

27. The method of claim 26, wherein the gel system includes:
between about 1 wt. % and about 20 wt. % of an anionic polymer,
between about 0.5 wt. % and about 50 wt. % of a cationic foaming agent,
between about 0.1 wt. % and about 20 wt. % of a betaine,
between about 2 wt. % and about 35 wt. % of an amine oxide, and
between about 1 wt. % and about 20 wt. % of a lower alcohol.

28. The method of claim 26, wherein the gel system includes:
between about 2.5 wt. % and about 20 wt. % of a cationic polymer,
between about 1 wt. % and about 50 wt. % of an anionic foaming agent,
between about 1 wt. % and about 20 wt. % of a betaine,
between about 5 wt. % and about 35 wt. % of an amine oxide, and
between about 2 wt. % and about 20 wt. % of a lower alcohol.

29. A method for fracturing a formation comprising the steps of:
pumping a fracturing fluid and a gas into a producing formation at a pressure sufficient to fracture the formation and to enhance productivity, where the fracturing fluid comprises a foamable, ionically coupled gel fracturing composition including between about 0.5 wt. % and about 20 wt. % of a charged polymer, between about 0.1 wt. % and about 50 wt. % of an oppositely charged foaming agent, between about 0.01 wt. % and about 20 wt. % of a betaine, between about 1 wt. % and about 35 wt. % of an amine oxide, and between about 0.1 wt. % and about 20 wt. % of a lower alcohol having between 1 and 5 carbon atoms, where one or more carbons atoms can be replaced with an oxygen, nitrogen, or sulfur atom, where the gel and the gas are present in amounts sufficient to form a foamed fracturing, ionically coupled gel composition, and
pumping a proppant after fracturing to prop open the fractured formation.

30. A method for making a foamed fracturing composition comprising the steps of:
dissolving between about 0.5 wt. % and about 20 wt. % of an anionic or cationic polymer in water and then adding between about 0.1 wt. % and about 50 wt. % of the oppositely charged foaming agent, between about 0.01 wt. % and about 20 wt. % of a betaine, between about 1 wt. % and about 35 wt. % of an amine oxide, and between about 0.1 wt. % and about 20 wt. % of a lower alcohol having between 1 and 5 carbon atoms, where one or more carbons atoms can be replaced with an oxygen, nitrogen, or sulfur atom, where the two components are present in an amount sufficient to form a foamable, ionically coupled gel fracturing composition.

31. A method for making a foamable fracturing composition comprising the steps of:
  forming a first additive composition comprising about 16.5 wt. % of a 16.25 wt. % poly diallyl dimethyl ammonium chloride (pDADMAC) solution, about 2.63 wt. % cocoamidopropyl betaine, about 3.46 wt. % coco amine oxide and about 77.66 wt. % deionized water with mixing,
  forming a second additive composition comprising about 25.0 wt. % ammonium lauryl sulfate, about 10 wt. % isopropyl alcohol (IPA) and about 65 wt. % dionized water with mixing,
  adding a second amount of the second additive composition to a first amount of the first additive composition in a ratio of the first additive to the second additive is between about 2:1 and about 6:1.

* * * * *